United States Patent
Shen et al.

(10) Patent No.: US 10,432,021 B2
(45) Date of Patent: Oct. 1, 2019

(54) EMERGENCY INVERTER AND EMERGENCY LIGHTING SYSTEM

(71) Applicant: SIGNIFY HOLDING B.V., Eindhoven (NL)

(72) Inventors: Xi Quan Shen, Shanghai (CN); James Nourse, Collierville (TN); Han Lu, Shanghai (CN); Jerzy Janczak, Libertyville (IL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/220,704

(22) Filed: Jul. 27, 2016

(65) Prior Publication Data

US 2017/0033598 A1 Feb. 2, 2017

(30) Foreign Application Priority Data

Jul. 27, 2015 (CN) .................. 2015 2 0549526 U

(51) Int. Cl.
*H02J 9/06* (2006.01)
*H05B 37/02* (2006.01)

(52) U.S. Cl.
CPC .......... *H02J 9/065* (2013.01); *H05B 37/0227* (2013.01)

(58) Field of Classification Search
CPC .......... H02J 7/025; H02J 5/005; H02J 7/0068; H02J 1/00; H02J 50/12; H02J 7/35; H02J 9/061; H05B 37/0227; H05B 37/0272; H05B 37/0218; H05B 37/0281; H05B 37/02; H05B 33/0845

USPC .................. 315/152, 153, 250, 297, 86, 121; 323/282

See application file for complete search history.

(56) References Cited

U.S. PATENT DOCUMENTS

| | | | | |
|---|---|---|---|---|
| 6,060,843 A | * | 5/2000 | Primisser ............. | H05B 41/282 315/194 |
| 7,256,554 B2 | * | 8/2007 | Lys ........................ | F21S 48/325 315/224 |
| 7,511,432 B2 | * | 3/2009 | Watanabe .......... | H05B 41/2928 315/209 R |
| 2010/0327763 A1 | * | 12/2010 | Yao ..................... | H05B 41/2985 315/250 |
| 2011/0184577 A1 | * | 7/2011 | Ilyes ................... | H05B 37/0272 700/295 |
| 2011/0298389 A1 | * | 12/2011 | Nagauchi ........... | H05B 41/2882 315/287 |

(Continued)

OTHER PUBLICATIONS

Title: U.S. Appl. No. 62/148,590 of U.S. Appl. No. 15/094,021, filed Apr. 16, 2015.*

(Continued)

*Primary Examiner* — Wei (Victor) Chan
(74) *Attorney, Agent, or Firm* — Meenakshy Chakravorty

(57) ABSTRACT

Embodiments of the present disclosure relate to an emergency inverter and an emergency lighting system. The emergency inverter comprises a power detecting module and a dimming signal generating module. The power detecting module is configured to detect an output power of the emergency inverter in an emergency state. The dimming signal generating module is coupled to the power detection module and configured to generate a dimming signal based on the output power of the emergency inverter in the emergency state.

18 Claims, 4 Drawing Sheets

(56) References Cited

U.S. PATENT DOCUMENTS

| | | | |
|---|---|---|---|
| 2012/0086353 A1* | 4/2012 | Nerone | H05B 41/2985 315/250 |
| 2012/0112641 A1* | 5/2012 | Leshniak | H02J 9/065 315/161 |
| 2013/0175931 A1* | 7/2013 | Sadwick | H05B 37/02 315/158 |
| 2015/0091463 A1* | 4/2015 | Jin | H05B 33/0809 315/201 |
| 2015/0108896 A1* | 4/2015 | Gordin | H02J 9/065 315/86 |
| 2015/0289325 A1* | 10/2015 | Szolusha | H05B 33/08 315/201 |
| 2016/0308390 A1* | 10/2016 | Garbowicz | H02J 9/065 |

OTHER PUBLICATIONS

Title: U.S. Appl. No. 62/148,590 of U.S. Appl. No. 15/094,021, filed Apr. 16, 2015 (Drawing).*
Title: Analog Dimming with the TPS61181, Date: Dec. 2011.*

* cited by examiner

EMERGENCY INVERTER AND EMERGENCY LIGHTING SYSTEM

TECHNICAL FIELD

The present disclosure relates to the technical field of lighting, and more specifically relates to an emergency inverter and an emergency lighting system including the emergency inverter.

BACKGROUND

Emergency lighting refers to lighting that is activated upon power failure. An objective of emergency lighting is to allow residents in a building to leave the building safely upon power failure or in other emergency occasions. Within a building, the emergency lighting is usually provided by an emergency lighting device (e.g., LED or fluorescent lamp) powered by an emergency inverter. A battery pack is provided in the emergency lighting device.

FIG. 1 illustrates a schematic diagram of an emergency inverter 100 without a dimming function in the prior art. As illustrated in FIG. 1, in the emergency state, a lighting device driver 500 receives an output power from the emergency inverter 100 to directly drive the emergency lighting device. Because the emergency inverter 100 does not have a dimming function, the lighting device driver 500 operates in full-load in an emergency state. Further, the number of available emergency lighting devices is limited, because the total power of the emergency lighting device has to be within a rated power of the emergency inverter 100.

FIG. 2 shows a schematic diagram of an emergency inverter 200 with a preset dimming function in the prior art. As illustrated in FIG. 2, the emergency inverter 200 comprises a preset dimming unit 201 for dimming an emergency lighting device in an emergency state. When the emergency inverter 200 is applied, it is needed to calculate a dimming level based on a rated output power of the emergency inverter 200, the number of lighting device drivers 500 connected to the emergency inverter 200, and characteristics of the lighting device drivers 500. Next, the dimming level is preset by the preset dimming unit 201 so as to ensure that the total power of the emergency lighting device is kept within the rated power of the emergency inverter 200. This causes applications of the emergency inverter 200 very inconvenient. In addition, if the features or number of emergency lighting devices change, it is needed to re-calculate and preset the dimming level, which increases work load and time costs.

SUMMARY

One of the objectives of the embodiments of the present disclosure is to provide an emergency inverter and an emergency lighting system that includes the emergency inverter, such that the emergency lighting device can be dimmed automatically and intelligently in an emergency state.

According to an aspect of the present disclosure, there is provided an emergency inverter, comprising: a power detection module configured to detect an output power of the emergency inverter in an emergency state; and a dimming signal generating module coupled to the power detection module and configured to generate a dimming signal based on the output power of the emergency inverter in the emergency state.

According to an exemplary embodiment of the present disclosure, the power detection module is further configured to detect an output voltage and an output current of the emergency inverter in the emergency state, and to calculate the output power of the emergency inverter based on the output voltage and the output current.

According to the exemplary embodiments of the present disclosure, the dimming signal generating module comprises an analog voltage generator, and the dimming signal is a voltage within a continuous range generated by the analog voltage generator.

According to the exemplary embodiments of the present disclosure, the continuous range includes 0~10V.

According to the exemplary embodiments of the present disclosure, the emergency inverter further comprises: a battery pack; a charging module coupled to the battery pack and configured to charge the battery pack in a non-emergency state; and a DC-to-AC converting module coupled to the battery pack and configured to convert a DC output of the battery pack to an AC output in the emergency state.

According to an exemplary embodiment of the present disclosure, the power detecting module is coupled to the DC-to-AC converting module and configured to detect an output power of the DC-to-AC converting module as the output power of the emergency inverter.

According to the exemplary embodiments of the present disclosure, the emergency inverter further comprises a line power control module configured to enable the emergency inverter to switch between the emergency state and a non-emergency state.

According to an exemplary embodiment of the present disclosure, a rated power of the emergency inverter is fixed or varies over time according to a curve.

According to another aspect of the present disclosure, there is provided an emergency lighting system, comprising: at least one lighting device; any emergency inverter as mentioned above; and at least one lighting device driver each configured to receive the dimming signal and adjust its power level based on the dimming signal so as to drive the respective lighting device.

According to the exemplary embodiment of the present disclosure, each lighting device is an LED or a fluorescent lamp.

In the technical solutions of various embodiments of the present disclosure, a dimming signal is generated based on an output power of the emergency inverter for adjusting power levels of respective lighting device drivers such that the emergency lighting device can be automatically and intelligently dimmed.

BRIEF DESCRIPTION OF THE ACCOMPANYING DRAWINGS

These and other objectives, features, and advantages will become apparent when reading detailed depiction of the exemplary embodiments with reference to the accompanying drawings, wherein.

DETAILED DESCRIPTION OF THE PREFERRED EMBODIMENTS

Hereinafter, the principle and method of the present disclosure will be described with reference to several exemplary embodiments in the accompanying drawings. It should be understood that these embodiments are described only for enabling those skilled in the art to better understand and then further implement the present disclosure, not intended to limit the scope of the present disclosure in any manner.

Figure 1:
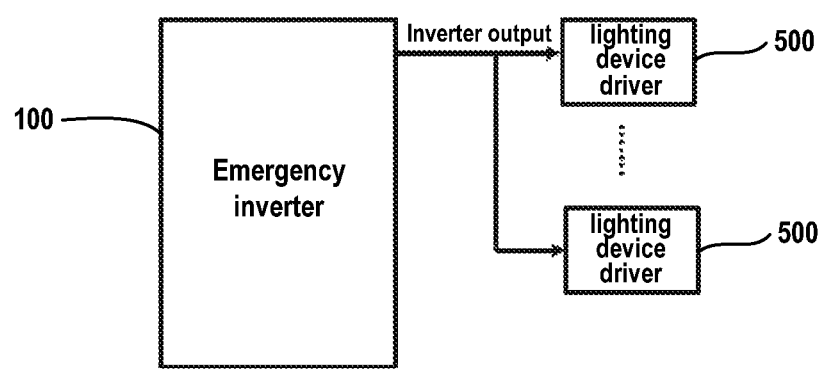
FIG. 1 illustrates a schematic diagram of an emergency inverter without a dimming function in the prior art.
Figure 2:
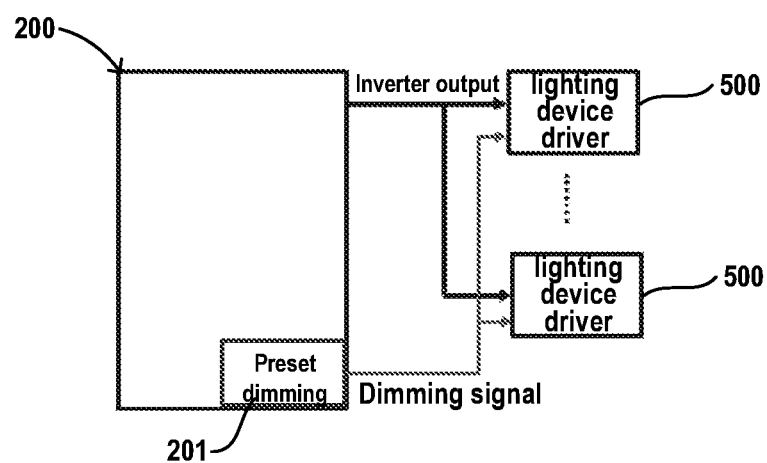
FIG. 2 illustrates a schematic diagram of an emergency inverter with a preset dimming function in the prior art.
Figure 3:
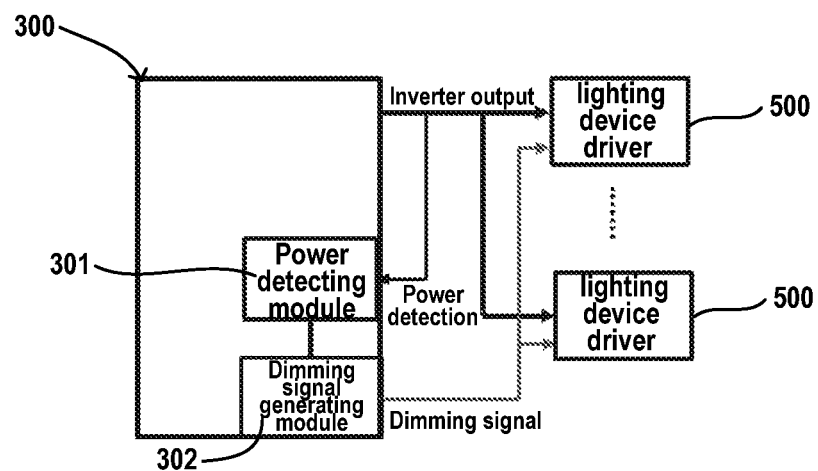
FIG. 3 illustrates a schematic diagram of an emergency inverter according to an exemplary embodiment of the present disclosure.

FIG. 3 illustrates a schematic diagram of an emergency inverter 300 according to an exemplary embodiment of the present disclosure. As illustrated in FIG. 3, the emergency inverter 300 comprises a power detecting module 301 and a dimming signal generating module 302. The power detecting module 301 is configured to detect an output power of the emergency inverter 300 in an emergency state (i.e., power failure state). The dimming signal generating module 302 is coupled to the power detecting module 301 and configured to generate a dimming signal based on the output power of the emergency inverter 300 in the emergency state. The dimming signal may correspond to different dimming levels so as to adjust the power level of an at least one lighting device driver 500. By adjusting the power level of respective lighting device drivers 500, the output power of the emergency inverter 300 (i.e., the power consumed by the connected emergency lighting device) could be within a rated power of the emergency inverter 300, e.g., the output power of the emergency inverter 300 could be equal to the rated power of the emergency inverter 300. Each lighting device driver 500 may be used to drive one or more corresponding lighting devices as required.

In various embodiments, the power detecting module 301 may be implemented using various available manners, as long as it can detect the output power of the emergency inverter 300. For example, the power detection module 301 may be implemented through a hardware circuit for detecting the output power of the emergency inverter 300. As another example, the power detecting module 301 may be implemented through a microcontroller (MCU), wherein the MCU is programmed with instructions for executing detection of the output power of the emergency inverter 300. The MCU may also be programmed with instructions for executing other functions.

Figure 4:
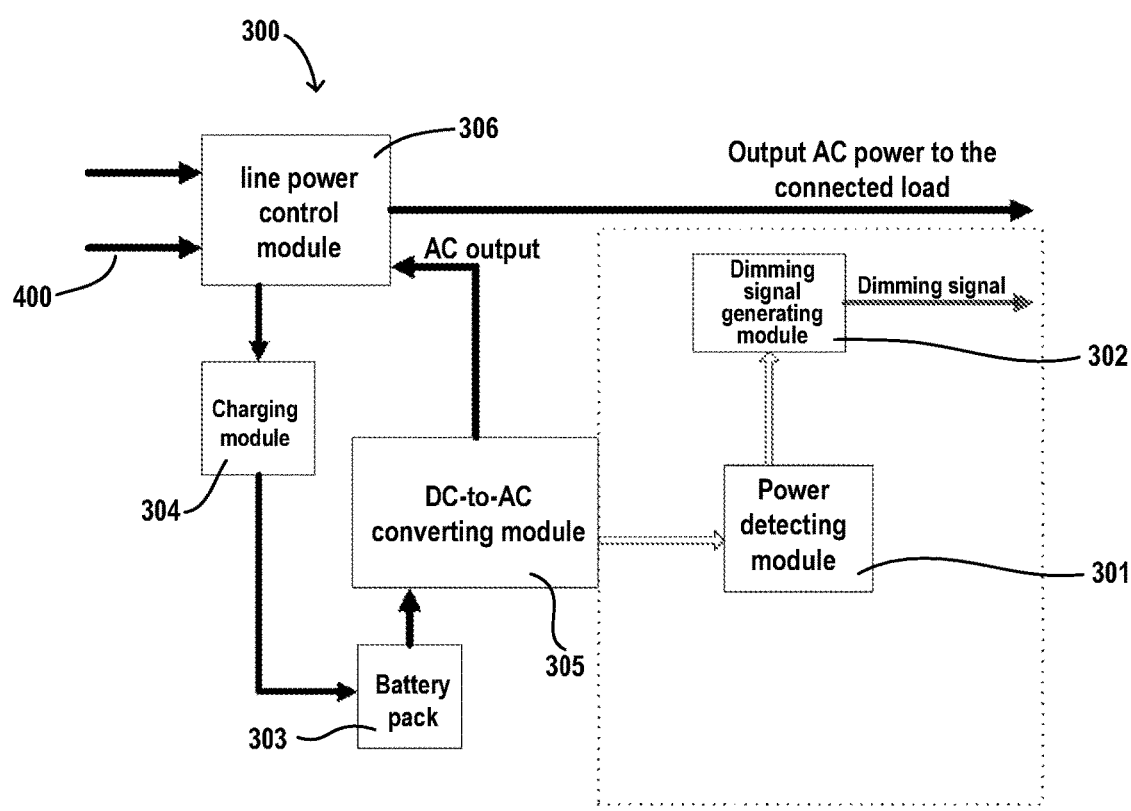
FIG. 4 illustrates a structural block diagram of an emergency inverter illustrated in FIG. 3.

In some embodiments, the power detection module 301 may be further configured to detect the output voltage and output current of the emergency inverter 300 in the emergency state, and to calculate the output power of the emergency inverter 300 based on the detected output voltage and output current. In other embodiments, the power detecting module 301 may also detect the output power of the emergency inverter 300 in other manner in the emergency state. For example, the power detecting module 301 may derive the output power of the emergency inverter 300 by detecting the output voltage and output current of the battery pack 303 as shown in FIG. 4. Further, the power detecting module 301 may also obtain the output power of the emergency inverter 300 by detecting the voltage and current at other position in the emergency inverter 300.

In various embodiments of the present disclosure, the dimming signal generating module 302 may comprise an analog voltage generator, and the dimming signal may be a voltage within a continuous range generated by the analog voltage generator. The voltage within the continuous range, for example, may include a 0~10V voltage or higher. Different voltage levels of the voltage generated by the analog voltage generator correspond to different power levels of respective lighting device drivers 500. The respective lighting device drivers 500 may determine corresponding power levels based on different voltage levels generated by the analog voltage generator so as to drive the respective emergency lighting device, such that the output power of the emergency inverter 300 is within the rated power of the emergency inverter 300.

In the emergency state, the power detecting module 301 automatically detects the output power of the emergency inverter 300 and provides the detected output power to the dimming signal generating module 302.

If the output power of the emergency inverter 300 is greater than the rated power of the emergency inverter 300, then the dimming signal generating module 302 generates a dimming signal that lowers the power level, and provides the generated dimming signal to respective lighting device drivers 500. This process of lowering the voltage level may be performed at a predetermined step length, e.g., the voltage level is decreased by 0.1V, 0.2V, 0.5V, 1V, or even greater each time. The respective lighting device driver 500 decreases its power level based on the above dimming signal, and stops the dimming process till the output power of the emergency inverter 300 matches the rated power of the emergency inverter 300, i.e., the total power of the lighting devices driven by the respective lighting device drivers 500 matches the rated power of the emergency inverter 300. The magnitude of the dimming signal generated by the dimming signal generating module 302 may have a linear or non-linear relationship with the power level provided by respective lighting device drivers 500, which will not be limited herein.

For example, it is assumed that the rated power of the emergency inverter 300 is 250 W, the dimming signal generated by the dimming signal generating module 302 is a 10V voltage, and at this time, the total power level corresponding to respective lighting device drivers 500 is 500 W. When the emergency inverter 300 is initially powered up in the emergency state, the power detecting module 301 detects the output power of 500 W. Because the output power 500 W detected by the power detecting module 301 is greater than the rated power 250 W of the emergency inverter 300, the dimming signal generating module 302 lowers the outputted voltage level. The process of lowering the voltage level may be performed in a predetermined step length, e.g., the voltage level is decreased by 0.1V, 0.2V, 0.5V, 1V, or even greater each time. After the voltage level is decreased each time, the power detecting module 301 continues detecting the output power of the emergency inverter 300, until the output power of the emergency inverter 300 matches the rated power of the emergency inverter 300.

If the voltage level generated by the dimming signal generating module 302 is in a linear relationship with the power level of the respective lighting device drivers 500, the dimming signal generating module 302 finally may regulate the dimming signal to a 5V voltage level, and consequently, the total power level of respective lighting device drivers 500 is regulated to 250 W so as to match the rated power of the emergency inverter 300. If the voltage level generated by the dimming signal generating module 302 is in a non-linear relationship with the power level of respective lighting device driver 500, the dimming signal generating module 302 finally may adjust the dimming signal to other corresponding voltage level (e.g., 4V or 6V, etc.) so as to regulate the total power of respective lighting device drivers 500 to 250 W.

If the output power of the emergency inverter 300 is equal to the rated power of the emergency inverter 300, it is unnecessary to dim. For example, it is assumed that the rated power of the emergency inverter 300 is 250 W, the dimming signal generated by the dimming signal generating module 302 is a 5V voltage, and at this time, the corresponding power level of respective lighting device drivers 500 is 250 W. Because the output power of the emergency inverter 300 is equal to the rated power of the emergency inverter 300, the dimming signal generating module 302 maintains the current voltage level such that the total power level of respective lighting device drivers 500 is maintained at 250 W.

When the output power of the emergency inverter 300 is less than the rated power of the emergency inverter 300, if the voltage level outputted by the dimming signal generating module 302 has not reached a maximum value, the dimming signal generating module 302 generates a dimming signal that increases the voltage level and provides the generated dimming signal to respective lighting device drivers 500. This process of increasing the voltage level may also be performed with a predetermined step length, e.g., the voltage level is increased by 0.1V, 0.2V, 0.5V, 1V, or even greater each time. Each lighting device driver 500 increases its power level based on the above dimming signal, and stops the dimming process till the output power of the emergency inverter 300 matches the rated power of the emergency inverter 300, i.e., the total power of the lighting devices driven by the respective lighting device drivers 500 match the rated power of the emergency inverter 300. The magnitude of the dimming signal generated by the dimming signal generating module 302 may have a linear or non-linear relationship with the power level provided by respective lighting device drivers 500, which will not be limited herein. If the voltage level outputted by the dimming signal generating module 302 has reached the maximum value, while the output power of the emergency inverter 300 is still less than the rated power of the emergency inverter 300, the above dimming process will also be stopped.

Therefore, despite of the features and number of respective lighting device drivers 500 of the emergency inverter 300, the emergency inverter 300 may automatically adjust the power level of respective lighting device drivers 500 in an absolute sense so as to control the output power of the emergency inverter 300 within a rated power of the emergency inverter 300. Within respective embodiments of the present disclosure, the rated power of the emergency inverter 300 may be fixed or vary with time in a curve, wherein the fixed value or variation curve may be preset in the microcontroller by a designer according to the design requirement.

Although an output voltage has been preferably selected as a dimming signal to describe the principle of the present disclosure, the dimming signal is not limited to the form of voltage. For example, in another embodiment, the dimming signal may be a digital signal generated by the dimming signal generating module 302. The dimming signal generating module 302 may generate a digital signal based on the output power detected by the power detecting module 301 and send the generated digital signal to respective lighting device drivers 500. The respective lighting device drivers 500 may regulate the respective power level based on the digital signal, wherein different digital signals correspond to different power levels of respective lighting device drivers 500. Further, in a further embodiment, the dimming signal may be a current signal generated by the dimming signal generating module 302. The dimming signal generating module 302 may generate a current signal based on the output power detected by the power generating module 301 and transmit the generated current signal to respective lighting device drivers 500. The respective lighting device drivers 500 may regulate corresponding power levels based on the current signal, wherein different current levels of the current signal correspond to different power levels of respective lighting device drivers 500.

FIG. 4 illustrates a structural block diagram of the emergency inverter 300 as shown in FIG. 3. As illustrated in FIG. 4, the emergency inverter 300 may also comprise a battery pack 303, a charging module 304, and a DC-to-AC converting module 305. The charging module 304 is coupled to the battery pack 303 and is configured to charge the battery pack 303 in a non-emergency state (i.e., power up state). The DC-to-AC converting module 305 is coupled to the battery pack 303 and configured to convert the DC output of the battery pack 303 to an AC output in the emergency state.

As illustrated in FIG. 4, the power detecting module 301 may be coupled to the DC-to-AC converting module 305 and configured to detect the output power of the DC-to-AC converting module 305 as the output power of the emergency inverter 300. For example, the power detecting module 301 may receive an output voltage and an output current from the DC-to-AC converting module 305 and calculate the output power of the DC-to-AC converting module 305 as the output power of the emergency inverter 300 based on the received output voltage and output current.

As illustrated in FIG. 4, the emergency inverter 300 may comprise a line power control module 306 that may be configured to enable the emergency inverter 300 to switch between the emergency state and the non-emergency state. In the emergency state, the DC-to-AC converting module 305 converts the DC output of the battery pack 303 into an AC output. The AC output of the DC-to-AC converting module 305 is provided to the connected emergency lighting device through the line power control module 306. In the emergency state, the power detecting module 301 detects the output power of the DC-to-AC converting module 305 and the dimming signal generating module 302 generates a dimming signal based on the output power of the DC-to-AC converting module 305. In the case of non-emergency state, the line power control module 306 receives power from a mains supply line 400 and provides the AC power to the connected lighting device. In the non-emergency state, the charging module 304 charges the battery pack 303.

In other embodiments of the present disclosure, there is further provided an emergency lighting system, which may comprise at least one lighting device, an emergency inverter 300, and at least one lighting device driver 500. Each lighting device driver 500 is configured to receive a dimming signal generated by the emergency inverter 300 and adjust its power level based on the dimming signal so as to drive the respective lighting device. As an example, the lighting device may be an LED or a fluorescent lamp, or any other type of lighting device.

Benefited from the teachings in the specification and the drawings, those skilled in the art may envisage many modifications and other embodiments of the present disclosure. Therefore, it should be understood that without being limited to the preferred embodiments as disclosed, all modifications and embodiments are intended to be included within the scope of the appended claims.

The invention claimed is:

1. An emergency inverter configured to provide an output power to a plurality of device drivers, comprising:
   a power detection module configured to detect an output current and an output voltage, and, based on the output current and output voltage, determine the total output power of the emergency inverter in an emergency state; and
   a dimming signal generating module coupled to the power detection module and configured to generate a dimming signal based on the total output power of the emergency inverter in the emergency state;
   wherein the dimming signal generating module is configured to generate the dimming signal in response to the total output power being detected by the power detection module as greater than a rated power of the emergency inverter and to send the dimming signal to the plurality of device drivers to instruct an adjustment of a power level of the plurality of device drivers, wherein the emergency inverter is configured to set the total output power in response to the power level of the plurality of device drivers, and wherein the emergency inverter is configured enable mains power to be provided as the output power when in a non-emergency state and to impose the rated power when the emergency inverter is in the emergency state.

2. The emergency inverter according to claim 1, wherein the dimming signal generating module comprises an analog voltage generator, and the dimming signal comprises a voltage within a continuous range generated by the analog voltage generator.

3. The emergency inverter according to claim 2, wherein the continuous range comprises 0~10V.

4. The emergency inverter according to claim 1, further comprising: a battery pack;
   a charging module coupled to the battery pack and configured to charge the battery pack in a non-emergency state; and
   a DC-to-AC converting module coupled to the battery pack and configured to convert a DC output of the battery pack into an AC output in the emergency state.

5. The emergency inverter according to claim 4, wherein the power detecting module is coupled to the DC-to-AC converting module and configured to detect an output power of the DC-to-AC converting module as the total output power of the emergency inverter.

6. The emergency inverter according to claim 1, further comprising a line power control module configured to enable the emergency inverter to switch between the emergency state and a non-emergency state.

7. The emergency inverter according to claim 1, wherein a rated power of the emergency inverter is fixed, or varies over time according to a curve.

8. An emergency lighting system comprising:
   at least one lighting device;
   the emergency inverter according to claim 1; and
   at least one lighting device driver each configured to receive the dimming signal and
   adjust its power level based on the dimming signal so as to drive the respective lighting device.

9. The emergency lighting system according to claim 8, characterized in that, each lighting device comprises an LED or a fluorescent lamp.

10. The emergency inverter of claim 1, wherein the power detecting module is configured to continually detect the total output power such that, in response to the dimming signal correspondingly generated by the dimming signal generator, the emergency inverter continues to instruct the plurality of device drivers with the dimming signal to incrementally decrease the power level of the plurality of device drivers until the total output power is detected as matching the rated power.

11. An emergency inverter configured to provide an output power to a plurality of device drivers, comprising:
    a power detection module configured to detect an output current and an output voltage, and, based on the output current and output voltage, determine the total output power of the emergency inverter in an emergency state; and
    a dimming signal generating module coupled to the power detection module and configured to generate a dimming signal based on the output power of the emergency inverter in the emergency state;
    wherein the dimming signal generating module is configured to generate the dimming signal in response to the output power being detected by the power detection module as less than a rated power of the emergency inverter and to send the dimming signal to the plurality of device drivers to instruct an adjustment of a power level of the plurality of device drivers,
    wherein the emergency inverter is configured to set the output power in response to the power level of the device drivers, and
    wherein the emergency inverter is configured enable mains power to be provided as the output power when in a non-emergency state and to impose the rated power when the emergency inverter is in the emergency state.

12. The emergency inverter of claim 11, wherein the power detecting module is configured to continually detect the output power such that, in response to the dimming signal correspondingly generated by the dimming signal generator, the emergency inverter continues to instruct the plurality of device drivers with the dimming signal to incrementally increase the power level of the plurality of device drivers until the output power is detected as matching the rated power.

13. The emergency inverter according to claim 11, wherein the dimming signal generating module comprises an analog voltage generator, and the dimming signal comprises a voltage within a continuous range generated by the analog voltage generator.

14. The emergency inverter according to claim 11, further comprising:
    a battery pack;
    a charging module coupled to the battery pack and configured to charge the battery pack in a non-emergency state; and
    a DC-to-AC converting module coupled to the battery pack and configured to convert a DC output of the battery pack into an AC output in the emergency state.

15. The emergency inverter according to claim 14, wherein the power detecting module is coupled to the DC-to-AC converting module and configured to detect an output power of the DC-to-AC converting module as the output power of the emergency inverter.

16. The emergency inverter according to claim 11, further comprising a line power control module configured to enable the emergency inverter to switch between the emergency state and a non-emergency state.

17. An emergency lighting system comprising:
    a plurality of lighting devices;
    the emergency inverter according to claim 11; and
    the plurality of device drivers, the plurality of device drivers configured to receive the dimming signal and adjust a power level of the plurality of device drivers based on the dimming signal so as to respectively drive the plurality of lighting devices.

18. The emergency lighting system according to claim 17, characterized in that, the plurality of lighting devices comprises an LED or a fluorescent lamp.

* * * * *